United States Patent
Chami et al.

(10) Patent No.: US 9,742,045 B2
(45) Date of Patent: Aug. 22, 2017

(54) LITHIUM ELECTROCHEMICAL STORAGE BATTERY HAVING A CASING PROVIDING IMPROVED THERMAL DISSIPATION, ASSOCIATED BATTERY PACK AND PRODUCTION PROCESSES

(71) Applicant: COMMISSARIAT A L'ENERGIE ATOMIQUE ET AUX ENERGIES ALTERNATIVES, Paris (FR)

(72) Inventors: Marianne Chami, Fontaine (FR); Pierre Jost, Vizille (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/783,725

(22) PCT Filed: Apr. 9, 2014

(86) PCT No.: PCT/IB2014/060548
§ 371 (c)(1),
(2) Date: Oct. 9, 2015

(87) PCT Pub. No.: WO2014/167504
PCT Pub. Date: Oct. 16, 2014

(65) Prior Publication Data
US 2016/0301118 A1    Oct. 13, 2016

(30) Foreign Application Priority Data
Apr. 9, 2013 (FR) ...................... 13 53163

(51) Int. Cl.
*H01M 10/654* (2014.01)
*H01M 10/613* (2014.01)
(Continued)

(52) U.S. Cl.
CPC ..... *H01M 10/654* (2015.04); *H01M 10/0431* (2013.01); *H01M 10/0525* (2013.01);
(Continued)

(58) Field of Classification Search
CPC ......... H01M 10/0431; H01M 10/0525; H01M 10/0587; H01M 10/613; H01M 10/643; H01M 10/654; H01M 10/6562
See application file for complete search history.

(56) References Cited

U.S. PATENT DOCUMENTS

| 3,490,949 A | 1/1970 | Deschamps |
| 5,571,632 A | 11/1996 | Teramoto |

(Continued)

FOREIGN PATENT DOCUMENTS

| CN | 201690389 U | 12/2010 |
| DE | 10 2011 010664 A1 | 8/2012 |

(Continued)

OTHER PUBLICATIONS

Jul. 1, 2014 International Search Report issued in International Patent Application No. PCT/IB2014/060548.
(Continued)

*Primary Examiner* — Carlos Barcena
(74) *Attorney, Agent, or Firm* — Oliff PLC

(57) ABSTRACT

A lithium electrochemical storage battery including: at least one electrochemical cell; two current collectors, one of which is connected to the anode and the other to the cathode; and a casing of longitudinal axis X, the casing including a cap, a bottom, a lateral jacket joined both to the bottom and to the cap, and a central core arranged along the axis X, the central core being hollow at least over some of its height and made of a material the melting point of which is higher than the temperature reached by the cell when it malfunctions, the hollow portion of the central core opening onto the exterior (Continued)

of casing via the bottom and/or the cap and the central core having, at least one end of its hollow portion, an internal thread into which an external thread of a part forming one pole of the storage battery may be screwed.

24 Claims, 7 Drawing Sheets

(51) Int. Cl.
  *H01M 10/6562* (2014.01)
  *H01M 10/0587* (2010.01)
  *H01M 10/643* (2014.01)
  *H01M 10/0525* (2010.01)
  *H01M 10/04* (2006.01)
  *H01M 10/052* (2010.01)

(52) U.S. Cl.
  CPC ..... *H01M 10/0587* (2013.01); *H01M 10/613* (2015.04); *H01M 10/643* (2015.04); *H01M 10/6562* (2015.04); *H01M 10/052* (2013.01); *Y02E 60/122* (2013.01)

(56) References Cited

U.S. PATENT DOCUMENTS

| 5,677,076 | A | 10/1997 | Sato et al. |
| 5,741,606 | A | 4/1998 | Mayer et al. |
| 6,114,059 | A * | 9/2000 | Watanabe ........... H01M 2/0426 429/120 |
| 7,335,448 | B2 | 2/2008 | Kaito et al. |
| 7,338,733 | B2 | 3/2008 | Morita et al. |
| 7,348,098 | B2 | 3/2008 | Hayashi et al. |
| 2006/0121348 | A1 | 6/2006 | Mizutani et al. |
| 2008/0057392 | A1 | 3/2008 | Takamatsu et al. |
| 2008/0060189 | A1 | 3/2008 | Daidoji et al. |
| 2010/0316094 | A1 | 12/2010 | Tung |
| 2012/0114995 | A1 | 5/2012 | Qiu et al. |

FOREIGN PATENT DOCUMENTS

| EP | 0 887 876 A1 | 12/1998 |
| EP | 1 321 989 A2 | 6/2003 |
| EP | 2 105 986 A1 | 9/2009 |
| FR | 2 770 032 A1 | 4/1999 |
| FR | 2873495 A1 | 1/2006 |
| FR | 2 996 360 A1 | 4/2014 |
| WO | 2010/113502 A1 | 10/2010 |
| WO | 2012/115131 A1 | 8/2012 |

OTHER PUBLICATIONS

Oct. 13, 2015 International Preliminary Report on Patentability issued in International Patent Application No. PCT/IB2014/060548.

* cited by examiner

Fig.1
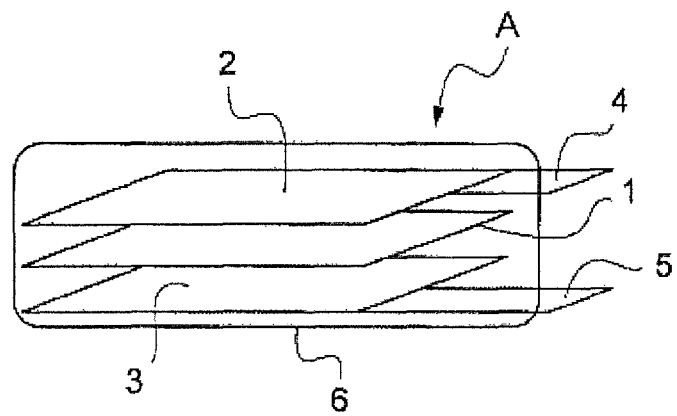
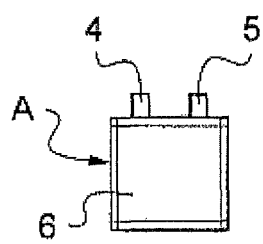
Fig.2
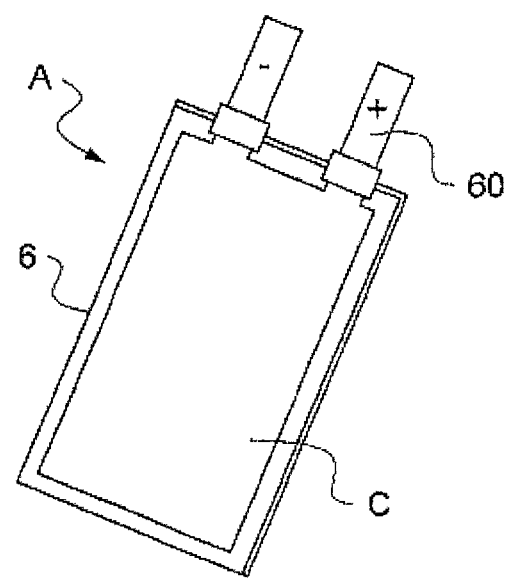
Fig.3

LITHIUM ELECTROCHEMICAL STORAGE BATTERY HAVING A CASING PROVIDING IMPROVED THERMAL DISSIPATION, ASSOCIATED BATTERY PACK AND PRODUCTION PROCESSES

TECHNICAL FIELD

The present invention relates to the field of lithium electrochemical generators that operate under the principle of insertion or deinsertion, or in other words intercalation/deintercalation, of lithium in at least one electrode.

It more particularly relates to a lithium electrochemical accumulator comprising at least one electrochemical cell made up of at least one anode and one cathode on either side of an electrolyte, two current collectors one of which is connected to the anode and the other to the cathode, and a casing of a shape that is elongate along a longitudinal axis (X), the casing comprising a cover, a bottom and a lateral jacket that is joined both to the bottom and to the cover, the casing being arranged to sealably contain the electrochemical cell(s) while also being passed through by a portion of the current collectors forming the poles.

The invention aims to provide a solution allowing the adverse consequences of heating of the electrochemical cell(s) during operation, and especially abnormal operation, of the accumulator, to be obviated.

The expression "abnormal operation" is here and in the context of the invention understood to mean an operation of a lithium that results during accidental overcharging and/or short-circuiting of the electrochemical cell(s) and that causes an increase in temperature above the maximum operating temperature encountered under nominal conditions.

The invention may equally well apply to a conventional lithium-ion battery architecture, which may be qualified monopolar, because based on a single electrochemical cell comprising one anode, one cathode and one electrolyte, as to a bipolar lithium battery architecture, comprising at least one bipolar current collector, also called a bipolar battery.

In such a bipolar battery, the bipolar collector bears on each of its opposite faces one of the two electrode materials of opposite sign, i.e. it bears a cathode (positive electrode) on one of the faces and an anode (negative electrode) on the other of the opposite faces.

PRIOR ART

Such as schematically illustrated in FIGS. 1 and 2, a lithium-ion accumulator or battery usually comprises at least one electrochemical cell C made up of an electrolyte constituent 1 between a positive electrode or cathode 2 and a negative electrode or anode 3, a current collector 4 connected to the cathode 2, a current collector 5 connected to the anode 3 and, lastly, a packaging 6 arranged to sealably contain the electrochemical cell while also being passed through by a portion of the current collectors 4, 5.

The architecture of conventional lithium-ion batteries is an architecture that may be qualified monopolar, because with a single electrochemical cell comprising one anode, one cathode and one electrolyte. A plurality of types of monopolar architecture geometry are known:

a cylindrical geometry such as disclosed in patent application US 2006/0121348;
a prismatic geometry such as disclosed in patents U.S. Pat. No. 7,348,098 and U.S. Pat. No. 7,338,733; and
a stacked geometry such as disclosed in patent applications US 2008/060189 and US 2008/0057392, and U.S. Pat. No. 7,335,448.

The electrolyte constituent 1 may be a solid, liquid or gel. In the latter case, the constituent may comprise a separator made of a polymer, a ceramic or a microporous composite imbibed with organic or ionic liquid electrolyte(s) that allow(s) lithium ions to move from the cathode to the anode during charging and vice versa during discharging, thereby generating a current. The electrolyte is in general a mixture of organic solvents, for example carbonates, to which a lithium salt, typically $LiPF_6$, is added.

The positive electrode or cathode 2 is formed from lithium cation insertion materials that are in general composites, such as $LiFePO_4$, $LiCoO_2$ and $LiNi_{0.33}Mn_{0.33}Co_{0.33}O_2$.

The negative electrode or anode 3 very often consists of graphite or $Li_4TiO_5O_{12}$ (titanate material), though optionally may also be based on silicon or a silicon-based composite.

The current collector 4 connected to the positive electrode is in general made of aluminum.

The current collector 5 connected to the negative electrode is in general made of copper, nickel-coated copper or aluminum.

A lithium-ion accumulator or battery may of course comprise a plurality of electrochemical cells that are stacked on top of one another.

Conventionally, a Li-ion accumulator or battery uses a pair of anode and cathode materials that makes it possible to operate at a high voltage level, typically equal to 3.6 volts.

Depending on the type of application envisioned, it is sought to produce either a thin and flexible lithium-ion accumulator or a rigid accumulator: the packaging is thus either flexible or rigid and in the latter case forms a casing so to speak.

Flexible packagings are usually manufactured from a multilayer composite consisting of a stack of aluminum layers covered with one or more polymer films that are laminated by adhesive bonding.

FIG. 3 illustrates this type of flexible packaging 6 arranged to sealably contain the electrochemical cell C while also being passed through by a portion of two strips 4, 5 forming the terminals and which extend in the plane of the electrochemical cell. As shown in FIG. 3, polymer reinforcements 60 based on polyolefin may be provided to improve the thermally produced seal of the packaging 6 around the strips 4, 5. The main advantage of flexible packagings is their lightness. Li-ion accumulators with the highest energy densities therefore have a flexible packaging. The major drawback of these flexible packagings is that their seal tightness deteriorates substantially over time because of the chemical nonresistance of the seal produced.

Rigid packagings are for their part used when the intended applications are exacting or a longer lifetime is sought, with for example much higher pressures to be withstood and a stricter sealing level required, typically lower than $10^{-8}$ mbar·l/s, or in inhospitable environments such as those encountered in the aeronautical or space field.

Thus, at the present time, one rigid packaging used consists of a metal casing, generally made of a light and inexpensive metal, typically of stainless steel (316L stainless steel or 304 stainless steel) or of aluminum (Al 1050 or Al 3003), or even of titanium. Furthermore, aluminum is generally preferred for its high thermal conductivity coefficient as explained below. Casings made of steel covered with a copper/nickel bimetal coating have already been envisioned in patent application WO2010/113502.

Casings made of plastic, in particular entirely made of polymer, have also already been envisioned, in particular in patent application US 2010/316094. Although of high mechanical strength, these casings have little chance of being economically viable because of the price of their constituent material.

Casings made of a mixed polymer/fiber material have also been envisioned.

Mention may lastly be made of casings integrated into carriers that allow the Li-ion accumulators to be recharged by a solar panel, such as a casing integrated into a cap as described in patent application CN 201690389 U.

The main advantage of rigid packagings is their high seal tightness and the fact that this seal tightness is maintained over time because such casings are welded shut, generally by laser welding. The major drawback of these rigid packagings is their high weight because of the metal used for the casing.

The geometry of most of the rigid casings of Li-ion accumulator packagings is cylindrical, because most accumulator electrochemical cells are wound onto spools having a cylindrical geometry. Casings of prismatic shape have also already been produced.

One type of cylindrical-shaped rigid casing, usually manufactured for high-capacity Li-ion accumulators of lifetime longer than 10 years, is illustrated in FIG. 4.

The casing 6 comprises a cylindrical lateral jacket 7, a bottom 8 at one end, and a cover 9 at the other end, the bottom 8 and the cover 9 being joined to the jacket 7. The cover 9 bears the current output terminals or poles 40, 50. One of the output terminals (poles), for example the positive terminal 40, is welded to the cover 9 whereas the other output terminal, for example the negative terminal 50, passes through the cover 9 with interposition of a seal (not shown) that electrically insulates the negative terminal 50 from the cover.

Independently of whether the packaging is flexible or rigid, in all the casings envisioned to this day the electrochemical cell(s) is (are) in fact contained in a chamber that is completely sealed with respect to the exterior.

However, when the lithium accumulator is operating, i.e. when the electrochemical cell is under voltage, heat is generated within the latter. This heating is to a lesser extent due to the passage of current to the current collectors and mainly due to electrochemical reactions within each cell.

Dissipation of this heat occurs naturally via the external walls of the electrochemical cell, i.e. those making contact with the packaging.

For this reason, the designers of lithium accumulators, and in particular Li-ion accumulators, systematically envision:
either small-diameter cylindrical-shaped accumulator casings with a height:diameter ratio higher than 1;
or prismatic-shaped accumulator casings with a larger wall area relative to those of cylindrical shape and again with a height:thickness ratio higher than 1. Accumulators of prismatic shape thus have an energy density higher than that of accumulators of cylindrical shape.

Under abnormal operating conditions, i.e. outside of nominal conditions, such as for example when accidental overcharging or a short-circuit generates a temperature higher than the maximum operating temperature, there is a risk of the accumulator exploding. Specifically, such conditions lead to heating of the electrolyte and to electrolyte vapors forming. Accumulation of these vapors in the casing leads to an increase in the internal pressure of the accumulator, which may lead to the casing bursting violently and to projection of chemical compounds that are corrosive and harmful to the environment and people located nearby. Safety devices, such as valves, exist, which prevent the accumulation of gases and thermal runaway in the interior of the casing of a sealed accumulator and allow gases to be released when the internal pressure exceeds a preset value: the reader may refer to the solutions described in patents U.S. Pat. No. 5,677,076; U.S. Pat. No. 5,741,606 and FR2873495B1.

During such malfunctions of the electrochemical cell forming an accumulator, heating occurs in the heart of the latter and when thermal dissipation is sufficient, and especially when the aforementioned safety devices are employed, no thermal runaway occurs. In the contrary case, thermal runaway may continue until the accumulator explodes.

Heating under abnormal operation of an accumulator may lead to temperatures comprised between 100 and 150° C. being obtained very rapidly in the heart of the accumulator. It has been observed that these temperatures are so high that the central core, which is conventionally made of a polymer (polyolefin or filled polyolefin), and around which the cell is wound by spooling, melts. This melting of the polymer central core leads to the passage of gases from the center of the accumulator being obstructed with uncontrolled thermal runaway resulting even when the aforementioned safety devices are employed. This may lead the accumulator to explode and burn. Melting of the polymer central core furthermore generates polluting or even toxic organic degradation products that may escape from the casing.

Patent FR 2873495 B1 describes a central axis made of aluminum, having an increased thermal resistance because of the higher melting point of aluminum, typically about 650° C. This being so, provided the safety device acting as a short-circuit provided in this patent FR 2873495B1 is not actuated, there is no real thermal dissipation from the heart of the accumulator because the chamber formed by the casing remains completely sealed with respect to the exterior. Furthermore, once the safety device is actuated by rupture of a thin portion of the bottom of the casing, the accumulator is irreversibly inoperatable.

There is therefore a need to improve thermal dissipation from the heart of a lithium accumulator comprising a rigid packaging consisting of a casing, in particular in abnormal operation of the electrochemical cell(s) of the accumulator, and especially with a view to circumventing the adverse consequences related to the heart of the accumulator becoming too hot.

There is a particular need to improve thermal dissipation from the heart of a lithium accumulator without this leading to the latter being irreversibly inoperable in the case of abnormal operation of the electrochemical cell(s) therein.

The aim of the invention is to at least partially meet this/these need(s).

SUMMARY OF THE INVENTION

To do this, the subject of the invention, according to one of its aspects, is a lithium electrochemical accumulator comprising at least one electrochemical cell made up of at least one anode and one cathode on either side of an electrolyte impregnated in a separator, two current collectors one of which is connected to the anode and the other to the cathode, a casing of a shape that is elongate along a longitudinal axis (X), the casing comprising a cover, a bottom and a lateral jacket that is joined both to the bottom and to the cover, and, a central core along the axis X, the central core being hollow at least over a portion of its height and made of a material the melting point of which is above the temperature reached by the cell(s) in abnormal operation, the casing being arranged to sealably contain the electrochemical cell(s) wound around the central core while also being passed through by a portion of the current collectors forming the poles.

According to the invention, the hollow portion of the central core opens onto the exterior of the casing via the bottom and/or cover, and the central core has, at at least one end of its hollow portion, an internal thread for receiving by screwing an external thread of a part forming one pole of the accumulator. Thus, a conventional step of fastening, especially by welding, a pole to the cover of a casing is avoided since the pole is screwed directly into the hollow central core according to the invention. The internal thread may advantageously open onto the bottom or onto the cover of the casing.

Preferably, the hollow part communicates with the exterior of the casing at both its ends, i.e. through the bottom and the cover.

The expression "material the melting point of which is above the temperature reached by the cell(s) in abnormal operation" is here and in the context of the invention understood to mean a material able to withstand the temperatures reached very rapidly and observed in abnormal operation of a lithium accumulator, generally above 100° C. and typically between 100° C. and 150° C.

Preferably, the central core is hollow over its entire height.

According to one variant embodiment, the casing and the central core are of generally cylindrical shape. Preferably, the diameter of the central core is comprised between 0.5 and 5 cm and again preferably between 1 and 2 cm, whereas the diameter of the casing is preferably comprised between 6 and 20 cm and again preferably equal to 10±2 cm.

Alternatively, according to another variant, the casing and the central core are of generally prismatic shape.

Preferably, the casing is made of a metal such as aluminum.

The casing may also be at least partially made of polymer. Thus, the casing may be made entirely of polymer.

The central core is preferably made of a metal such as aluminum. It may advantageously be a question of 1050 aluminum the melting point of which is about 650° C. and very much higher than the abnormal operating temperatures reached at the heart of the accumulator, i.e. between 100 and 150° C.

According to one advantageous embodiment, the metal central core is coated with a coating made of an electrical insulator, such as a coating made of polyolefin. Thus, possible short-circuits that could occur within the electrochemical cell are prevented. This may be the case when for example the spooling of the cell on the core is carried out manually: alignment defects may then be generated with the risk for example of bringing the negative electrode into electrical contact with the metal of the core. In other words, with the electrical insulating coating on the external surface of the core, there is absolutely no risk of short-circuits resulting from misalignment of the electrodes and central core during manual spooling.

Preferably, the central core has a smooth external surface. The hollow central core thus matches as closely as possible the shape of the cell during the winding.

According to one advantageous variant embodiment, the central core has at at least one end of its hollow portion an internal shape suitable for making a tight fit with the mandrel of a machine for spooling the electrochemical cell(s). In other words, according to this variant the hollow core according to invention serves as a spool that may be reliably fastened to the mandrel of a winding machine (spooler).

According to one advantageous embodiment, the central core has at one of its ends the internal shape suitable for a tight fit and at the other of its ends the internal thread for screwing the terminal of the accumulator.

According to one variant embodiment, provision may be made for one or more passive cooling elements, such as one or more fins, in the interior of the hollow portion of the central core. Whatever the aforementioned variant (shapes enabling fitting on a mandrel, internal thread, additional cooling fins), increasing the internal surface area in the hollow of the central core is advantageous because this has the effect of increasing thermal dissipation by heat exchange with air originating from outside the casing.

According to one improvement of the invention, the passive cooling element(s) is (are) arranged so as to make contact with the internal portion of the tube forming the central core. It may be a question of an insert or indeed fins, typically made of a thermally conductive metal such as stainless steel, copper or aluminum. Advantageously, the passive cooling element will be welded or even brazed to the casing, or indeed even forcefully fitted into the central core by wedging against the internal walls of the hollow tube forming the central core.

According to one variant embodiment, the central core may be welded around a through-aperture in the bottom and/or cover.

Alternatively, according to another variant, the central core and the bottom of the casing may consist of a single deep-drawn part.

The lithium accumulator according to the invention may comprise a portion of a safety device, such as a valve, integrated into the cover and suitable for releasing to the exterior gases present in the interior of the casing in the case of pressures higher than a preset threshold value. This is particularly advantageous for cells wound with a large diameter (large thickness). Advantageously, the center of the portion of the safety device making contact with the exterior is arranged halfway between the edge of the cover and the center of the central core.

Thus, a Li-ion accumulator according to the invention is characterized by a hollow central core that introduces a continuous body of air originating from the exterior into the electrochemical cell.

By virtue of the invention, continuous thermal dissipation from a lithium accumulator is not only achieved via the walls of the casing as in the prior art but also via the body of air in the center of the accumulator and, optionally, the passive cooling element(s) placed on the path of the body of air.

In other words, compared to a lithium accumulator according to the prior art, an accumulator according to the invention continuously dissipates heat from within it by way of air originating from the exterior. When the hollow core opens at both ends of the accumulator, i.e. when it passes from the bottom to the cover, a flow of air is advantageously introduced by natural convection.

The invention relates, according to another of its aspects, to a battery pack comprising a plurality of accumulators such as described above, a metal box containing the plurality of accumulators electrically connected in series or in parallel to one another, two poles, namely a negative pole that is common to the accumulators and that forms a feedthrough through a wall of the box and a positive pole that is common to the accumulators and fastened to one wall of the box, and a film made of an electrical insulator between at least one end of the accumulators and one wall of the box.

According to one embodiment, the plurality of accumulators is arranged vertically in the metal box, the negative common pole forming the feedthrough through the lower or upper wall whereas the positive common pole is fastened, especially by welding, to the opposite wall, i.e. to the upper or lower wall, respectively.

The invention relates, according to yet another of its aspects, to a process for producing a lithium accumulator comprising at least one electrochemical cell made up of at least one anode and one cathode on either side of an electrolyte impregnated in a separator, and a casing arranged to sealably contain the electrochemical cell(s) while also being passed through by a portion of the current collectors forming the poles, comprising steps consisting in:

a/ winding by spooling the anode, the cathode and the separator of the electrochemical cell(s) about a central core that is hollow over at least a portion of its height; the core having at at least one end of its hollow portion an internal thread;

b/ welding, at one of the ends of the wound cell, the current collector portion bearing the anode to a terminal current collector portion taking the form of a shim;

c/ inserting the wound cell with the shim into a rigid container forming the bottom and lateral jacket of a casing;

d/ welding, at the other of the ends of the wound cell, the current collector portion bearing the cathode to the bottom of the casing;

e/ welding the shim to a negative pole forming a feedthrough through a cover;

f/ welding the cover to the rigid container;

g/ welding the hollow central core around an aperture in the bottom and/or cover and into which it is fitted; and h/ screwing the positive pole into the internal thread of the hollow central core.

According to this alternative version of the production process, the bottom and lateral jacket form a single hollow part or cup.

The invention relates, according to yet another of its aspects, to a process for producing a lithium accumulator comprising at least one electrochemical cell (1) made up of at least one anode and one cathode on either side of the electrolyte impregnated in a separator, and a casing arranged to sealably contain the electrochemical cell(s) while also being passed through by a portion of the current collectors forming the poles, comprising steps consisting in:

a1/ winding by spooling the anode, the cathode and the separator of the electrochemical cell(s) about an element comprising a central core that is hollow over at least a portion of its height and a plate forming the bottom of a casing; the core having at at least one end of its hollow portion an internal thread;

b1/ welding, at one of the ends of the wound cell, the current collector portion bearing the anode to a terminal current collector portion taking the form of a shim;

c1/ welding, at the other of the ends of the wound cell, the current collector portion bearing the cathode to the bottom of the casing;

d1/ inserting the wound cell with the shim into a rigid container forming the lateral jacket of the casing;

e1/ welding the bottom to the lateral jacket;

f1/ welding the shim to a negative pole forming a feedthrough through a cover;

g1/ welding the cover to the rigid container;

h1/ if need be, welding the hollow central core around an aperture in the cover and into which it is fitted; and i1/ screwing the positive pole into the internal thread of the hollow central core.

Once step f/ or g1/ has been carried out, the liquid electrolyte is inserted through a filling aperture produced in the cover in order to impregnate the separator(s) of the cell(s).

Depending on the type of lithium insertion electrode materials chosen for the constituent electrodes of an electrochemical cell according to the invention, the current collector formed by at least one metal sheet may be made of aluminum or have its surface metalized with another metal, for example be made of aluminum superposed on copper.

The expression "electrode made of a lithium insertion material" is here and in the context of the invention understood to mean an electrode comprising at least one lithium insertion material and at least one polymer binder. Optionally, the electrode may in addition comprise an electronic conductor, for example carbon fibers or carbon black.

The expression "lithium insertion material", in particular for the positive electrode, is here and in the context of the invention understood to mean a material chosen from spinal lithiated oxides containing manganese, lamellar lithiated oxides, and mixtures thereof, and polyanionic framework lithiated oxides of formula $LiM_y(XO_2)_n$ where M represents an element chosen from Mn, Fe, Co, Ni, Cu, Mg, Zn, V, Ca, Sr, Ba, Ti, Al, Si, B and Mo and X represent an element chosen from P, Si, Ge, S and As, y, z and n being positive integers.

The expression "lithium insertion material", in particular for the negative electrode, is also understood to mean a material chosen from: a lithiated or non-lithiated titanium oxide, for example $Li_4Ti_5O_{12}$ or $TiO_2$. More particularly, the negative electrode material may be chosen from carbonated materials, non-lithiated titanium oxides and their derivatives and lithiated titanium oxides, such as $Li_4Ti_5O_{12}$, and their derivatives, and a mixture thereof.

The expression "lithiated derivative" is here and in the context of the invention understood to mean compounds of formula $Li_{(4-x1)}M_{x1}Ti_5O_{12}$ and $Li_4Ti_{(5-y1)}N_{y1}O_{12}$, where x1 and y1 are respectively comprised between 0 and 0.2 and M and N are respectively chemical elements chosen from Na, K, Mg, Nb, Al, Ni, Co, Zr, Cr, Mn, Fe, Cu, Zn, Si and Mo.

The expression "non-lithiated derivative" is here and in the context of the invention understood to mean $Ti_{(5-y1)}N_{y1}O_{12}$, where y1 is comprised between 0 and 0.2 and N is a chemical element chosen from Na, K, Mg, Nb, Al, Ni, Co, Zr, Cr, Mn, Fe, Cu, Zn, Si and Mo.

Preferably, the anodes are made of $Li_4Ti_5O_{12}$ and the cathodes of $LiFePO_4$.

The term "separator" is here and in the context of the invention understood to mean an electrically insulating ionic conductor formed by at least one polymeric material such as polyvinylidene fluoride (PVDF), polyvinyl acetate (PVA), polymethyl methacrylate (PMMA), polyoxyethylene (POE) or polyethylene terephthalate (PET) or a polymer chosen from the polyolefins such as polypropylene, polyethylene or cellulose.

The electrolyte according to the invention may be a liquid formed by a mixture of carbonate and at least one lithium salt. The expression "lithium salt" is preferably understood to mean a salt chosen from $LiPF_6$, $LiClO_4$, $LiBF_4$ and $LiAsF_6$.

Alternatively, the electrolyte may comprise one or more ionic liquids based on lithium ions, namely a salt formed from lithium cations complexed with organic or inorganic anions, which has the property of being a liquid at room temperature. An ionic liquid, depending on the nature of the anion, may be hydrophilic or hydrophobic. By way of example of ionic liquids, mention may be made of ionic liquids based on hydrophobic anions such as trifluoromethanesulfonate ($CF_3SO_3$), bis(trifluoromethanesulfonate)imide [$(CF_3SO_2)_2N$] and tris(trifluoromethanesulfonate)methide [$(CF_3SO_2)_3C$].

The deposition of each electrode on the electrically conductive portion forming a current collector of at least one of the devices may be carried out using a conventional printing technique such as screen printing, rotogravure printing, flexographic printing, spraying, etc.

It will be noted that the term "feedthrough" is understood in the conventional way to mean a device serving to pass an electrically conductive element through a wall while insulating the conductor from this wall.

DETAILED DESCRIPTION

Other advantages and features will become more clearly apparent on reading the detailed description, given by way of illustration and with reference to the following figures, in which:

FIG. 1 is a schematic exploded perspective view showing the various elements of a lithium-ion accumulator;

FIG. 2 is a front view showing a lithium-ion accumulator with its flexible packaging according to the prior art;

FIG. 3 is a perspective see-through view of a lithium-ion accumulator with its flexible packaging according to the prior art;

For the sake of clarity, the same references are used in all of FIGS. 1 to 12 to designate equivalent elements of a lithium-ion accumulator according to the prior art and according to the invention.

It will be noted that the various elements according to the invention are shown only for the sake of clarity and that they are not to scale.

Lastly it will be noted that here and throughout the present application, the terms "lower", "upper", "vertical", "upward", "downward", "below" and "above" are to be understood with reference to a lithium accumulator arranged in a vertical position with its cover at the top end of the casing.

FIGS. 1 to 4 have already been discussed in detail in the preamble. They are therefore not described below.

Figure 4:
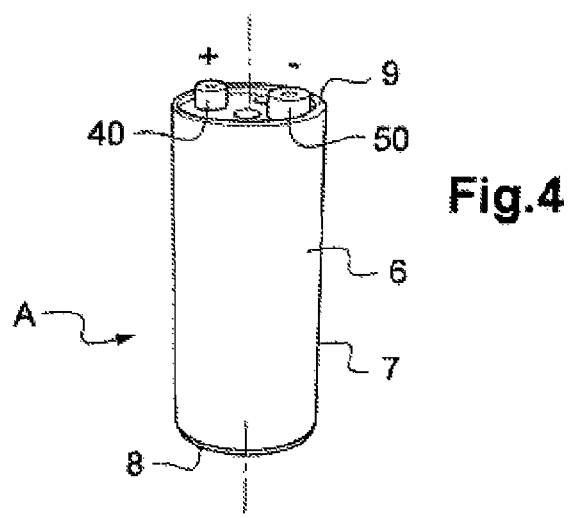
FIG. 4 is a perspective view of a lithium-ion accumulator according to the prior art with its rigid packaging formed by a casing.
Figure 5:
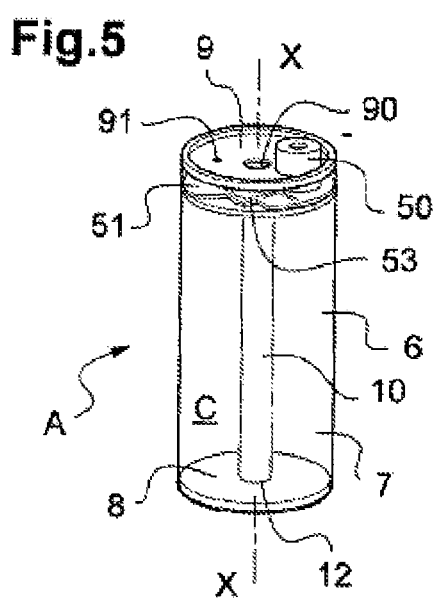
FIG. 5 is a perspective view of a lithium-ion accumulator according to the prior art with its rigid packaging formed by a casing.

FIG. 5 shows a lithium-ion accumulator A according to the invention.

The accumulator A firstly comprises at least one electrochemical cell C made up of at least one anode and one cathode on either side of an electrolyte impregnated in a separator. The anode and the cathode are made of lithium insertion material and may be deposited using a conventional technique in the form of an active layer on a metal sheet forming a current collector. By way of example, the anode is made of $Li_4Ti_5O_{12}$, the cathode of $LiFePO_4$ and the current collector sheets of aluminum.

The Li-ion accumulator comprises two current collectors one of which is connected to the anode and the other to the cathode of each cell C.

The accumulator also comprises a sealed casing 6, by way of rigid packaging, the casing being of a shape that is elongate along a longitudinal axis (X).

The casing 6 comprises a cylindrical lateral jacket 7, a bottom 8 at one end and a cover 9 at the other end, the bottom 8 and the cover 9 being joined to the jacket 7 by welding.

The cover 9 bears the current output terminals or poles 50. The positive pole (not shown) is welded to the cover 9 whereas the negative pole 50 passes through the cover 9 with interposition of a seal (not shown), thereby forming a feedthrough that electrically insulates the pole 50 from the cover 9.

Such as illustrated in FIG. 5, a shim 51, taking the form of a solid disk 52 drilled in its center and of a tongue 53 folded on itself, is housed between the upper end of the cell C, to which it is welded, and the cover 9. The shim 51 forms a portion of the terminal current collector ensuring the continuity between the current collector supporting the anode of the cell, also referred to as the negative support, and the negative pole 50.

The lower end of the cell C is for its part welded to the bottom 8 of the casing 6.

In order to improve thermal dissipation from the heart of the electrochemical cell C in operation of the accumulator, especially in abnormal operation, the inventors have thought to introduce a continuous body of air into the cell C, the air originating from outside the casing 8. This continuous body of air making contact with the exterior ensures a continuous dissipation of heat from the center or in other words the heart of the wound cell C.

The inventors have thus envisioned a solution that is simple to implement, namely providing a cylinder forming a hollow central core 10 along the axis X and about which the electrochemical cell C is wound, this core being made of a material the melting point of which is higher than the temperature reached by the cell in abnormal operation, and the hollow portion 11, 12 of which opens onto the exterior of the casing via the bottom 8 and/or cover 9.

Such as illustrated in all of FIGS. 5 to 16, the central core 10 is hollow over its entire height and its two hollow ends 11, 12 open, through the cover 9 and the bottom 8, respectively, onto the exterior of the casing 6. Thus, it is possible to obtain a continuous flow of air through the interior of the core 10 by natural convection, thereby further increasing the dissipation of heat from the heart of the wound cell. However, the central core 10 may be hollow over only some of its height and then only one of its ends 11 or 12 is hollow and opens onto the exterior of the casing 6.

Such as illustrated in all of FIGS. 5 to 16, the hollow central core 10 preferably has an external surface that is smooth in order to best match the shape of the cell C during its winding, and an internal thread 14 at one of its ends in order to make it possible to receive the external thread (not shown) of the output terminal (pole) of the accumulator 40.

The hollow central core 10 is advantageously made of metal and more advantageously of aluminum the melting point of which, at about 650° C., is much higher than the temperatures reached during abnormal operation of the accumulator, typically as high as 150° C.

Figure 6A:
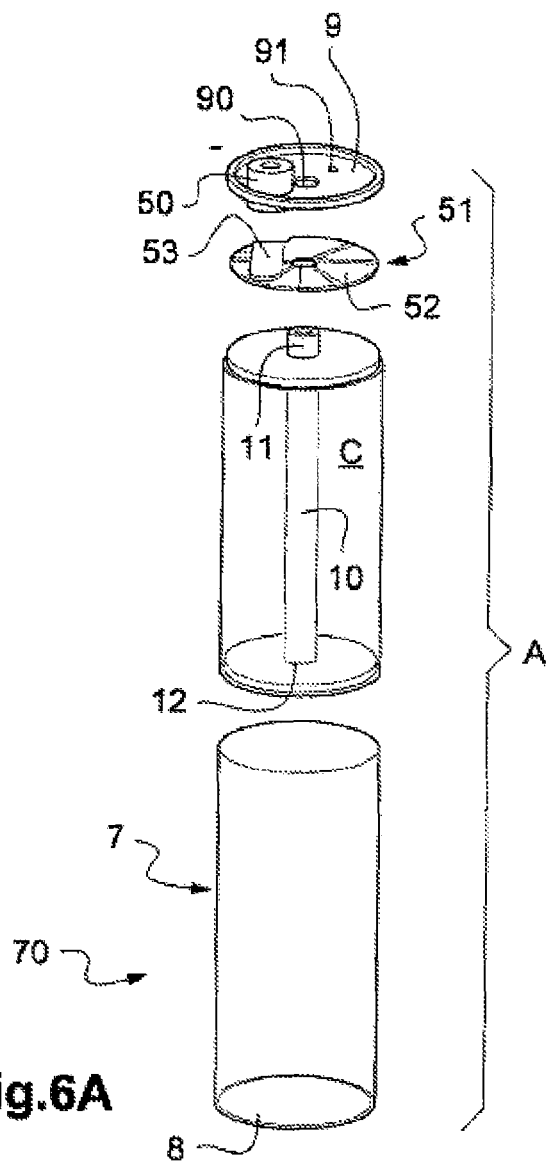
FIG. 6A is an exploded perspective view showing the various elements of a lithium-ion accumulator according to a first embodiment of the invention.
Figure 6B:
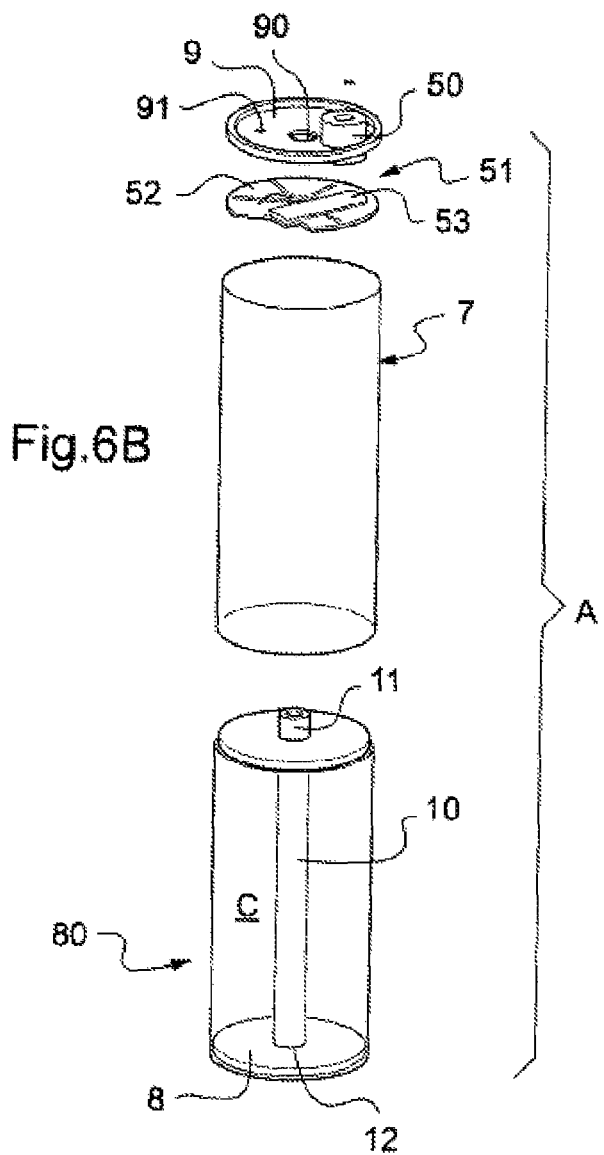
FIG. 6B is an exploded perspective view showing the various elements of a lithium-ion accumulator according to a second embodiment of the invention.

Two separate embodiments may be envisioned for producing the Li-ion accumulator according to the invention:
  one consists in winding, by spooling, the cell C directly around the hollow central core 10 according to the invention then in housing this wound sub-assembly in a rigid container 70 integrating both the bottom 8 and the lateral jacket 7 and thus forming a cup (FIGS. 6A and 13);
  the other consists in winding, by spooling, the cell C directly around a carrier 80 integrating both the hollow central core 10 according to the invention and the bottom 8, then in housing this wound sub-assembly in a rigid container consisting only of a lateral jacket 7 (FIG. 6B).

Figures 7, 8, 9:
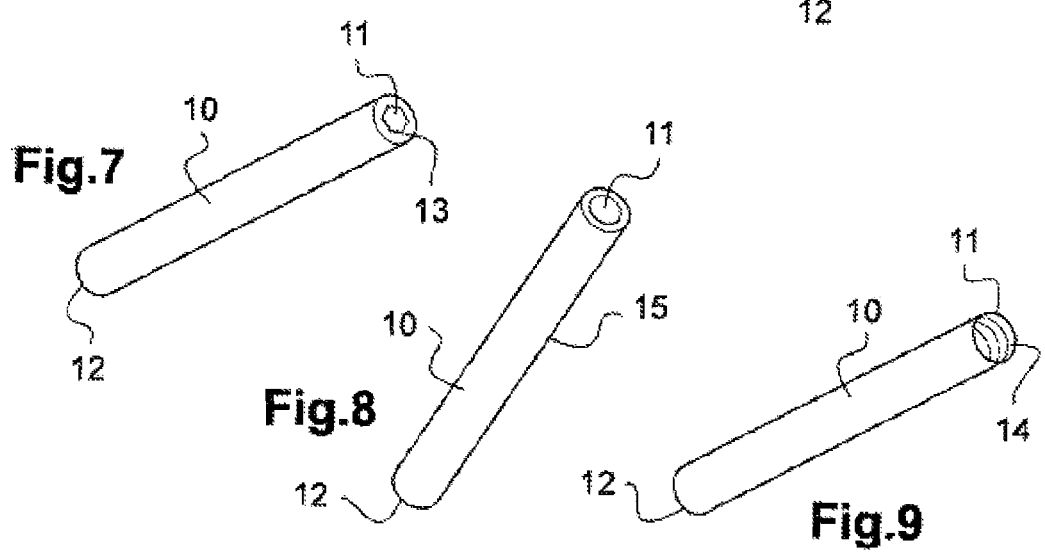
FIGS. 7 to 9 are perspective views of a hollow central core of cylindrical shape according to first, second and third variant embodiments of the invention, respectively.

The internal shape of the hollow central core 10 may be a homothetic transform of the external shape, such as a hollow cylinder as illustrated in FIG. 5. It may also be suitable for making a tight fit with the mandrel of a machine for spooling the cell C: this is illustrated in FIG. 7 in which it may be seen that the interior 13 of the hollow end 11 is a regular polygonal shape, such as a pentagon or a hexagon, in order to engage by complementary interfitting with a mandrel of complementary shape. The hollow central core 10 then directly forms the spool of the cell.

The internal shape is advantageously internally threaded at one and/or other of its ends in order to receive by screwing a positive pole 40 of the accumulator A: this is shown in FIG. 8 and in FIGS. 13, 14, 15A, 15B and 16 in which the terminal fastened in place by screwing 40 and the threaded interior 14 may be seen. Care is taken that the interior of the terminal fastened in place by screwing 40 is also hollow in order to ensure the body of air still extends from the interior of the core 10 to the exterior. A busbar 41, preferably of small thickness and rectangular shape and containing a hole 42, is interposed between the bottom 8 and the terminal fastened in place by screwing 40. This busbar is made of a conductor, for example of copper.

In order to prevent possible short-circuits that could occur in the cell, provision may advantageously be made to coat the external surface of the hollow metal core with a coating 15 made of an electrical insulator such as polyolefin (FIG. 9).

Figure 10:
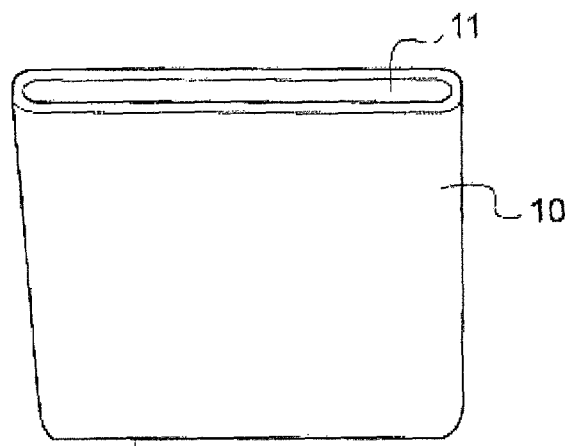
FIG. 10 is a perspective view of a hollow central core of prismatic shape according to another variant embodiment of the invention.

The casing 6 and the hollow central core 10 according to the invention may be cylindrical in shape. They may also be prismatic in shape: provision is then made for a hollow central core 10 in the form of a hollow prism that is a homothetic transform of the prismatic jacket 7, as shown in FIG. 10.

The various steps of the process for producing a Li-ion accumulator of cylindrical shape according to the second embodiment of the invention illustrated in FIG. 6B will now be described with reference to FIGS. 11A to 11F.

A carrier 80 comprising a aluminum central core 10 that is hollow over its entire height and a plate 8 made of aluminum forming the bottom 8 of a casing 6 (FIG. 11A) are produced beforehand.

Figure 11A:
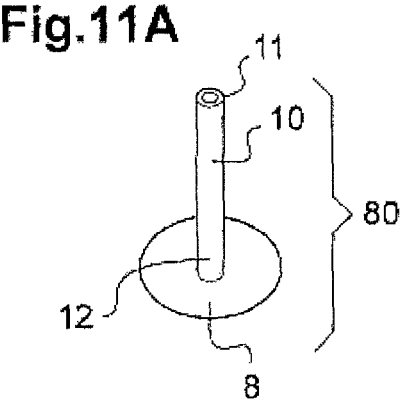
FIGS. 11A to 11F are perspective views illustrating the various steps of a process for producing a lithium-ion accumulator according to one embodiment of the invention.
Figure 11B:
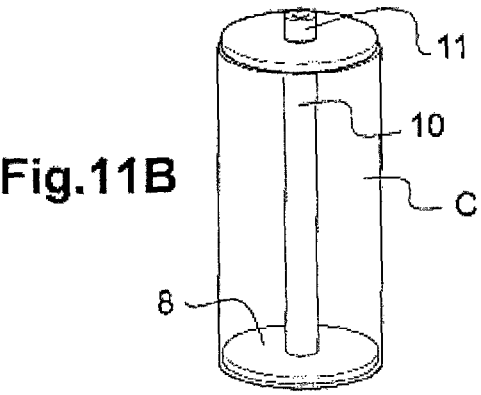

Step a1/:
The anode, the cathode and the separator of the electrochemical cell C are wound, by spooling, around the core 10 of the carrier 80 (FIG. 11B). The carrier 80 may take the form of a single part produced by deep-drawing. It may also be produced by fitting one of the ends 11 or 12 of the hollow core into a circular central aperture in a solid disk forming the plate 8, then by welding these two parts together around the circular aperture.

Step b1/:
At one of the ends of the wound cell, the current collector portion bearing the cathode (positive support) is welded to the bottom 8 of the casing 6 (FIG. 11B).

Figure 11C:
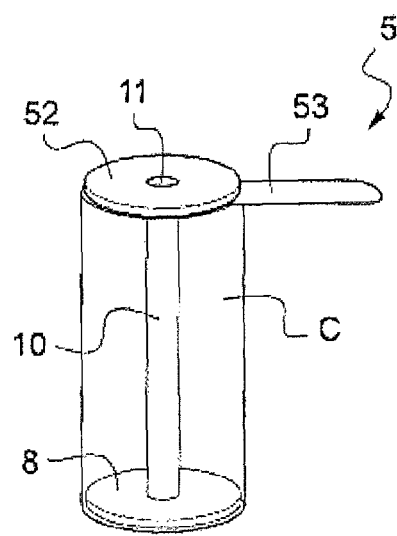

Step c1/:
At the other of the ends of the wound cell, the current collector portion bearing the anode (negative support) is welded to a terminal current collector portion taking the form of a shim 51 (FIG. 11C). More precisely, the shim 51 takes the form of a solid disk 52 drilled in its centre and into which the end 11 of the core 10 is fitted, and of a tongue 53 protruding laterally from the disk 52.

Figure 11D:
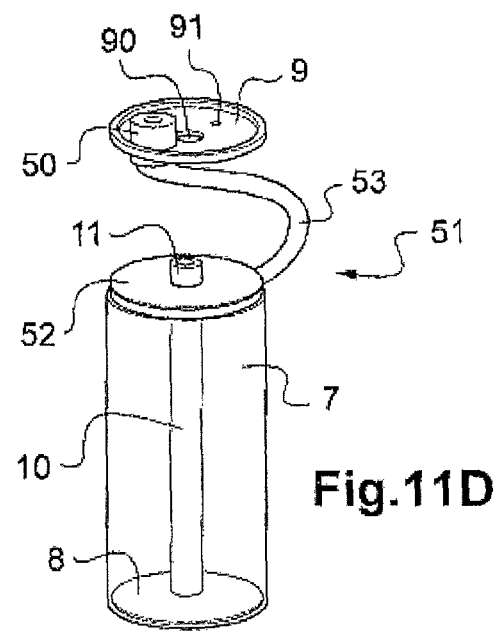

Step d1/:
The wound cell with the shim 51 is inserted into a rigid container made of aluminum forming only the lateral jacket 7 of the casing 6 (FIG. 11D). Care is in particular taken in this step d1/ that the tongue 53 of the shim 51 does not hinder the insertion. For this reason, the latter is advantageously folded upward.

Step e1/:
The bottom 8 is welded to the cylindrical lateral jacket 7. To do this, a circular weld is produced on the circular edge 81 of the bottom 8 (FIG. 11D).

Step f1/:
The shim 51 is welded to a negative pole 50 forming a feedthrough through a cover 9 (FIG. 11D). This cover 9 comprises a central through-aperture 90 suitable for having the upper hollow end 11 of the hollow central core 10 fitted therein.

This cover 9 also comprises another through-aperture 91 of smaller diameter than the aperture 90 and offset laterally relative to the axis X of the core. Typically, this other through-aperture 91 is located halfway between the circular edge 92 of the cover and the axis X of the central core 10. This other through-aperture 91 forms the aperture for releasing gases of a safety device integrated into the accumulator casing 6 in case of overpressure in the interior. The safety device may be one conventionally used in Li-ion batteries, also referred to as "venting".

Figure 11E:
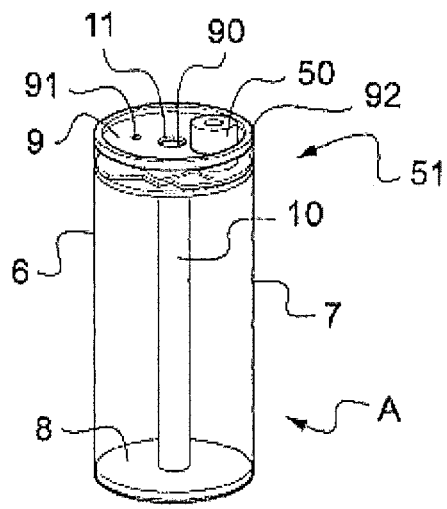

Step g1/:
Next, the cover 9 is welded to the rigid metal container 7. Prior to this step g1/, care is taken that the cover 9 is put in place on the upper end of the cylindrical lateral jacket 7, the hollow end 11 being fitted into the aperture 90 of the cover 9. This welding step consists in producing a circular weld on the circular edge 92 of the cover 9 (FIG. 11E).

Figure 11F:
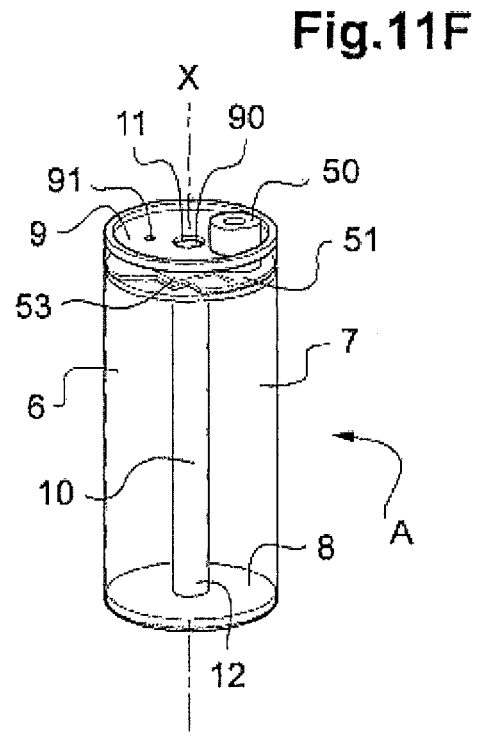

Step h1/:

Next the hollow central core 10 is welded around the central aperture 90 of the cover 9 into which it is fitted. To do this, a circular weld is produced around the hollow end 11 fitted into the central aperture 90 of the cover 9 (FIG. 11F).

Step i1/:

as shown in FIGS. 13, 15A, 15B and 16, the hollow positive pole 40 is then screwed into the internal thread 14 of the hollow central core 10.

Next, a step of filling under vacuum the casing 6 with a liquid electrolyte through another through-aperture (not shown) that is produced in the cover 9 is carried out.

Production of the Li-ion accumulator according to the invention finishes with stopping of the filling aperture by means of a rivet (not shown).

By virtue of the continuous body of air originating from the exterior and introduced into the heart of the cell C, an accumulator according to the invention, production of which has just been described, benefits from continuous dissipation of heat during its operation. A Li-ion accumulator according to the invention is therefore safer than prior-art Li-ion accumulators.

Because they are safer, a plurality of accumulators according to the invention, i.e. comprising a continuous body of air that extends from the exterior of the casing 6, may be assembled together to form a new battery arrangement (battery pack).

Figure 12:
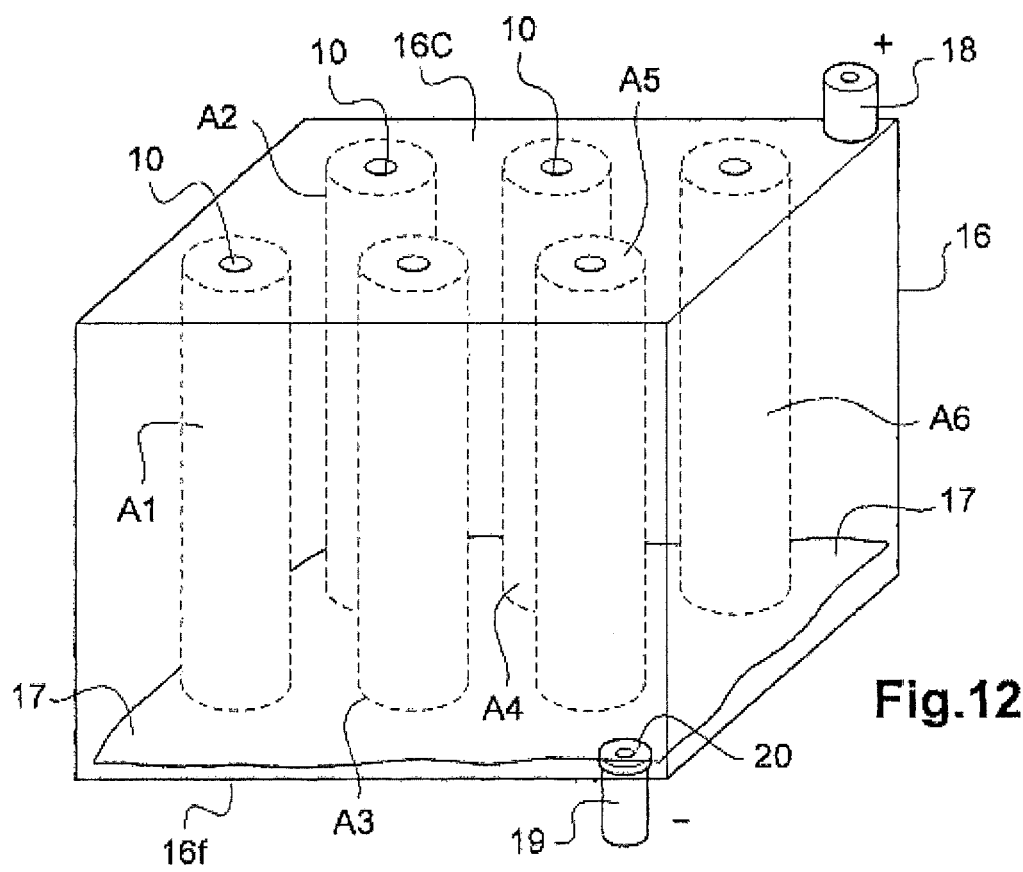
FIG. 12 is a perspective view of a battery pack comprising a plurality of lithium-ion accumulators according to the invention and a metal box containing the plurality of lithium-ion accumulators.
Figure 13:
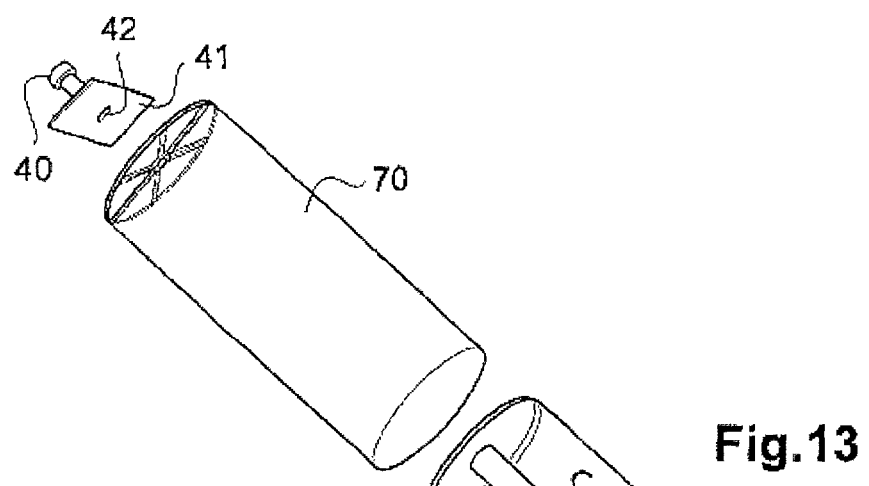
FIG. 13 is an exploded perspective view of a lithium-ion accumulator according to the invention.
Figure 14:
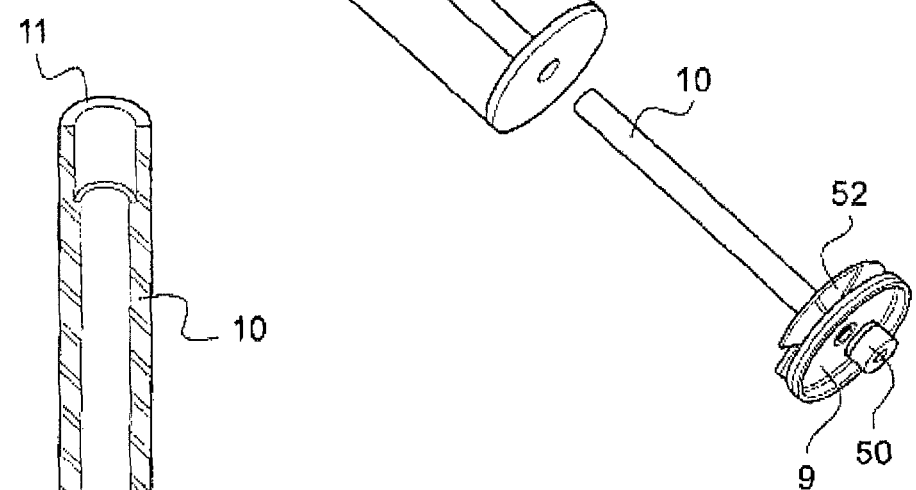
FIG. 14 is a longitudinal cross-sectional view of the central core of prismatic interior shape of a lithium-ion accumulator according to the invention.
Figure 15A:
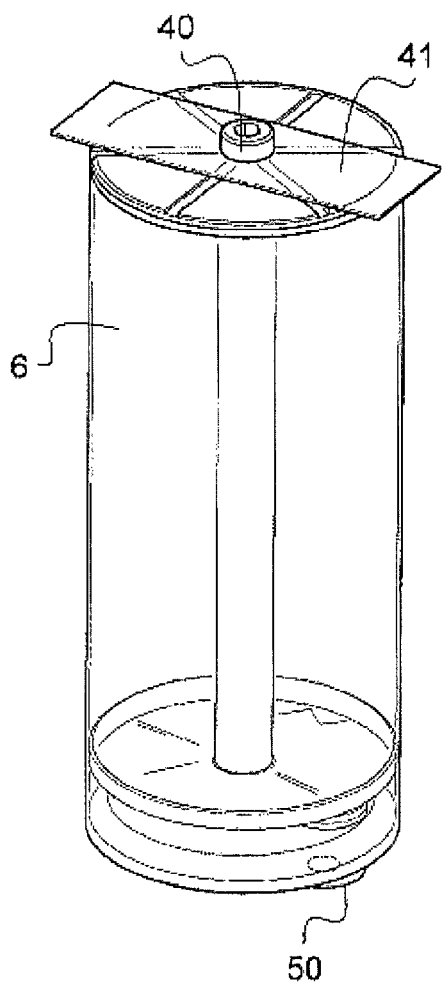
FIG. 15A is a perspective view of a lithium-ion accumulator according to the invention.
Figure 15B:
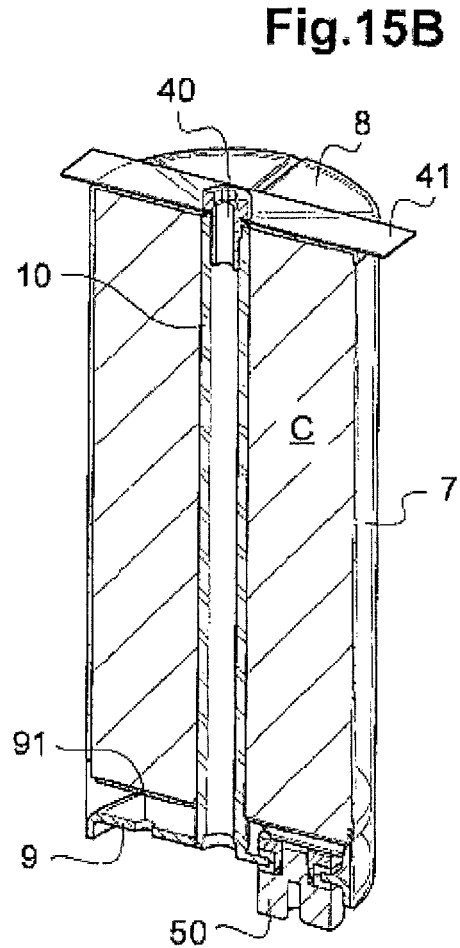
FIG. 15B is a longitudinal cross-sectional view of a lithium-ion accumulator according to the invention.
Figure 16:
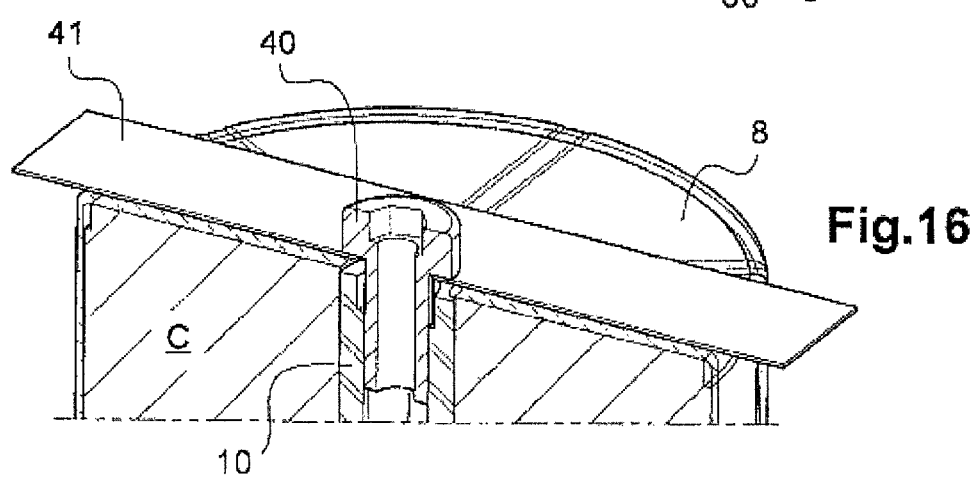
FIG. 16 is a magnified bottom view of a lithium-ion accumulator according to the invention.

FIG. 12 shows a battery pack comprising a plurality of cylindrically shaped Li-ion accumulators A1, A2 ... A6 according to the invention connected together electrically in series or parallel and contained in the same metal box 16 forming a common packaging.

At the bottom of the metal box 16 a film 17 made of an electrical insulator is arranged.

The accumulators A1-A6 are all connected to a positive terminal 18 fastened, especially by welding, to the cover 18S of the box 16, and to a negative terminal 19 forming a feedthrough through the bottom 16f of the box, by way of a seal 20 made of an electrical insulator.

Such as illustrated in FIG. 12, the metal box 16 is a rectangular parallelepipedal shape but provision could be made for it to be another shape.

Such as illustrated in FIG. 12, all the accumulators A1-A6 are identical to one another. Provision could be made to house within the same metal box 16 accumulators according to the invention having different electrical properties (capacity, energy density, voltage, etc.) and/or different dimensions.

The invention is not limited to the examples described above; in particular features of the illustrated examples may especially be combined together in variants that are not illustrated.

Thus, although in the illustrated examples, the negative terminal (pole) is that which forms a feedthrough through the cover 9 and the positive terminal is that which is electrically connected to the electrically conductive casing 6, the opposite case may be envisioned, depending on the chemistry of the materials of the electrodes and their arrangement in the electrochemical cell.

Furthermore, although in the illustrated examples, the positive pole not forming a feedthrough is welded to one portion of the casing 6, i.e. the cover 9, it is possible to envision it being welded to the bottom 8, i.e. to an opposite end of the casing 6.

Although in the illustrated example of the production process, step c1 of welding the shim 51 was carried out before the cell wound around the carrier 80 was introduced into the lateral jacket 7 and the bottom 8 welded to the latter, it may be carried out afterward, i.e. the cell C wound around the carrier 80 may be inserted into the lateral jacket 7 and then the bottom 8 and lastly the shim 51 welded thereto.

Although in the examples illustrated in FIGS. 5, 6A, 6B and 11A-11F, the casing 6 and the hollow central core 10 are cylindrical in shape, the accumulator according to the invention and all its described production steps may be implemented with a casing and a hollow central core of prismatic shape.

Even though this is not apparent from the schematic figures, it is possible to envision hollow central cores 10 of large diameters in order to further increase the continuous dissipation of heat from an accumulator according to the invention. This may prove to be important especially for electrochemical cells that are analyzed as being at risk and/or that are liable to see significant heating. Of course, in these cases, care is taken to ensure a good compromise is obtained between the power of the accumulator and its weight, on account of the fact that a hollow central core of large diameter will add to the weight of the accumulator assembly.

Moreover, although described with reference to a monopolar battery, the invention also applies to a bipolar battery. Thus, the Applicant filed on Oct. 1, 2012 a patent application FR 12 59260 that describes and claims a solution for spooling bipolar batteries around a core. Thus, the invention may apply to a hollow central core 10 used as a spool (bobbin) of a bipolar battery.

Other variants and improvements are possible without however departing from the scope of the invention.

Although in the illustrated embodiments, the terminal that is screwed into the internal thread of the hollow central core is the positive terminal, it could equally well be the negative terminal.

Moreover, although in the embodiment illustrated in FIGS. 13 to 16, the terminal screwed into the internal thread of the hollow central core is intended to be located at the bottom end of the accumulator, it could equally well be located at the top end.

The invention claimed is:

1. A lithium electrochemical accumulator comprising:
at least one electrochemical cell (C) made up of at least one anode and one cathode on either side of an electrolyte impregnated in a separator,
two current collectors, one of which is connected to the anode and the other to the cathode,
a casing of a shape that is elongate along a longitudinal axis, the casing comprising:
a cover,
a bottom, and
a lateral jacket that is joined both to the bottom and to the cover, and
a central core along the axis X, the central core being hollow at least over a portion of its height and made of a material, the melting point of which is above the temperature reached by the cell(s) in abnormal operation,
the casing being arranged to sealably contain the electrochemical cell(s) wound around the central core while also being passed through by a portion of the current collectors forming the poles, the hollow portion of the central core opening onto the exterior of the casing via the bottom and/or cover,
wherein the central core has, at at least one end of its hollow portion, an internal thread for receiving by screwing an external thread of a part forming one pole of the accumulator.

2. The accumulator as claimed in claim 1, the central core being hollow over its entire height.

3. The accumulator as claimed in claim 1, the casing and the central core being of generally cylindrical shape.

4. The accumulator as claimed in claim 1, the casing and the central core being of generally prismatic shape.

5. The accumulator as claimed in claim 1, the casing being made of a metal.

6. The accumulator as claimed in claim 1, the casing being at least partially made of polymer.

7. The accumulator as claimed in claim 1, the central core being made of a metal.

8. The accumulator as claimed in claim 7, the metal central core being coated with a coating made of an electrical insulator.

9. The accumulator as claimed in claim 1, the central core having a smooth external surface.

10. The accumulator as claimed in claim 1, the central core having at at least one end of its hollow portion an internal shape suitable for making a tight fit with a mandrel of a machine for spooling the electrochemical cell(s).

11. The accumulator as claimed in claim 10, the central core having at one of its ends the internal shape suitable for the tight fit and at the other of its ends the internal thread for screwing the pole of the accumulator.

12. The accumulator as claimed in claim 1, the internal thread opening onto the bottom or onto the cover of the casing.

13. The accumulator as claimed in claim 1, the central core being welded around a through-aperture in the bottom and/or cover.

14. The accumulator as claimed in claim 1, the central core and the bottom of the casing consisting of a single deep-drawn part.

15. The accumulator as claimed in claim 1, comprising one or more passive cooling elements.

16. The accumulator as claimed in claim 15, the passive cooling element(s) being arranged so as to make contact with the internal portion of a tube forming the central core.

17. The accumulator as claimed in claim 15, the passive cooling element(s) being one or more fins in the interior of the hollow portion of the central is core.

18. The accumulator as claimed in claim 1, comprising a portion of a safety device integrated into the cover and suitable for releasing to the exterior gases present in the interior of the casing in case of pressures higher than a preset threshold value.

19. The accumulator as claimed in claim 18, the center of the portion of the safety device making contact with the exterior being arranged halfway between the edge of the cover and the center of the central core.

20. A battery pack comprising:
a plurality of accumulators as claimed in claim 1,
a metal box containing the plurality of accumulators electrically connected in series or in parallel to one another,
two poles, the poles comprising:
a negative pole that is common to the accumulators and that forms a feedthrough through a wall of the box and
a positive pole that is common to the accumulators and fastened to one wall of the box, and
a film made of an electrical insulator between at least one end of the accumulators and one wall of the box.

21. The battery as claimed in claim 20, the plurality of accumulators being arranged vertically in the metal box, the negative common pole forming the feedthrough through the lower or upper wall whereas the positive common pole is fastened to the opposite wall, respectively.

22. A process for producing a lithium accumulator comprising at least one electrochemical cell made up of at least one anode and one cathode on either side of an electrolyte impregnated in a separator, and a casing arranged to sealably contain the electrochemical cell(s) while also being passed through by a portion of the current collectors forming the poles, comprising:
a/ winding by spooling the anode, the cathode and the separator of the electrochemical cell(s) about a central core that is hollow over at least a portion of its height; the core having at at least one end of its hollow portion an internal thread;
b/ welding, at one of the ends of the wound cell, the current collector portion bearing the anode to a terminal current collector portion taking the form of a shim;
c/ inserting the wound cell with the shim into a rigid container forming the bottom and lateral jacket of a casing;
d/ welding, at the other of the ends of the wound cell, the current collector portion bearing the cathode to the bottom of the casing;
e/ welding the shim to a negative pole forming a feedthrough through a cover;
f/ welding the cover to the rigid container;
g/ welding the hollow central core around an aperture in the bottom and/or cover and into which it fitted; and
h/ screwing the positive pole into the internal thread of the hollow central core.

23. A process for producing a lithium accumulator comprising at least one electrochemical cell made up of at least one anode and one cathode on either side of the electrolyte impregnated in a separator, and a casing arranged to sealably contain the electrochemical cell(s) while also being passed through by a portion of the current collectors forming the poles, comprising:
a1/ winding by spooling the anode, the cathode and the separator of the electrochemical cell(s) about a carrier comprising a central core that is hollow over at least a portion of its height and a plate forming the bottom of a casing; the core having at at least one end of its hollow portion an internal thread;
b1/ welding, at one of the ends of the wound cell, the current collector portion bearing the cathode to the bottom of the casing;
c1/ welding, at the other of the ends of the wound cell, the current collector portion bearing the anode to a terminal current collector portion taking the form of a shim;
d1/ inserting the wound cell with the shim into a rigid container forming the lateral jacket of the casing;
e1/ welding the bottom to the lateral jacket;
f1/ welding the shim to a negative pole forming a feedthrough through a cover;
g1/ welding the cover to the rigid container;
h1/ optionally, welding the hollow central core around an aperture in the cover into which it is fitted; and
i1/ screwing the positive pole into the internal thread of the hollow central core.

24. The production process as claimed in claim 23, in which once step f1/ or g1/ has been carried out, the liquid electrolyte is inserted through a filling aperture produced in the cover in order to impregnate the separator(s) of the cell(s).

* * * * *